Dec. 28, 1926.  1,612,359
H. E. CHIPMAN
PRODUCTION AND REPRODUCTION OF TALKING MOTION PICTURES
Filed Jan. 26, 1921   3 Sheets-Sheet 1
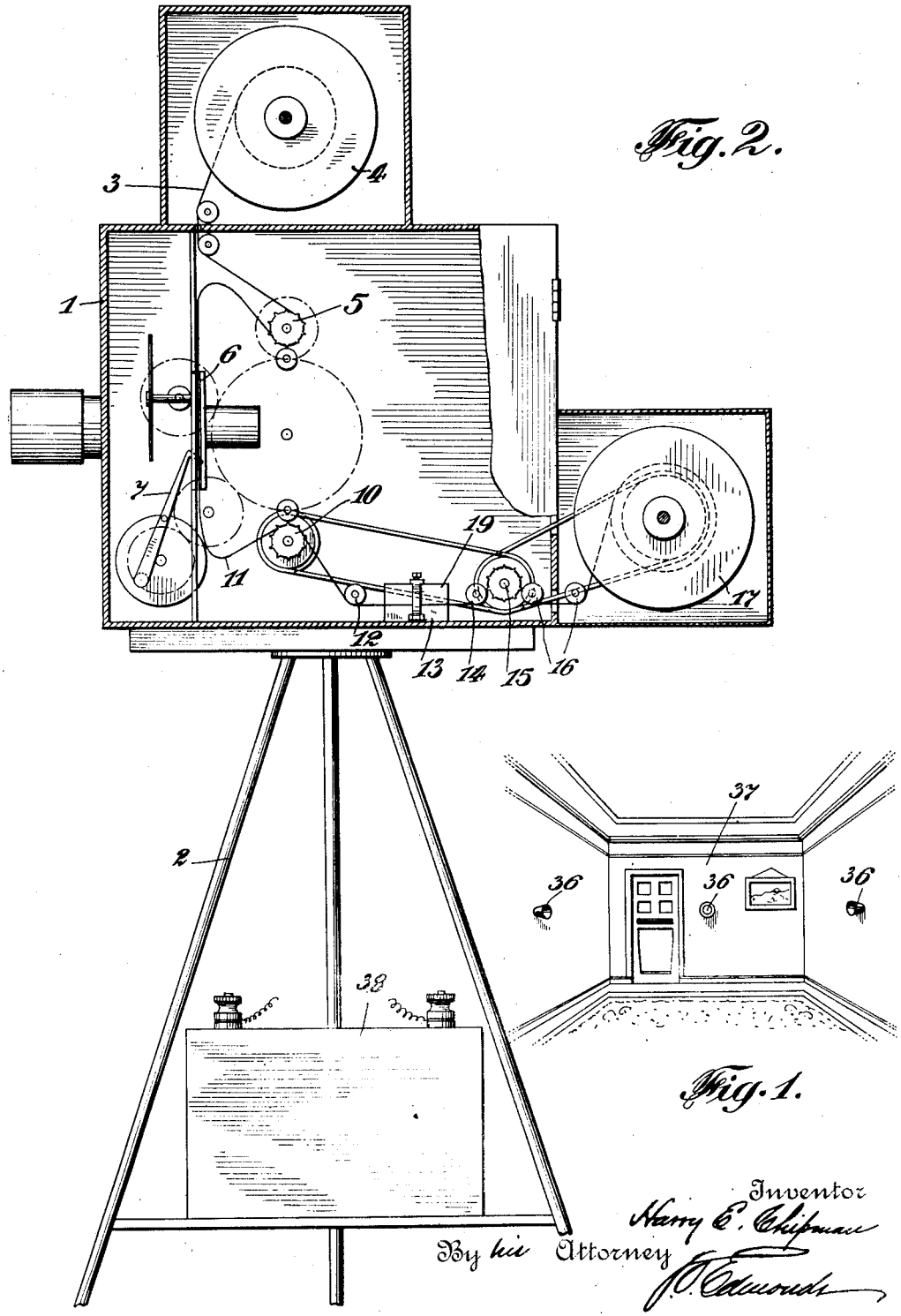

Dec. 28, 1926.
H. E. CHIPMAN
1,612,359
PRODUCTION AND REPRODUCTION OF TALKING MOTION PICTURES
Filed Jan. 26, 1921  3 Sheets-Sheet 2
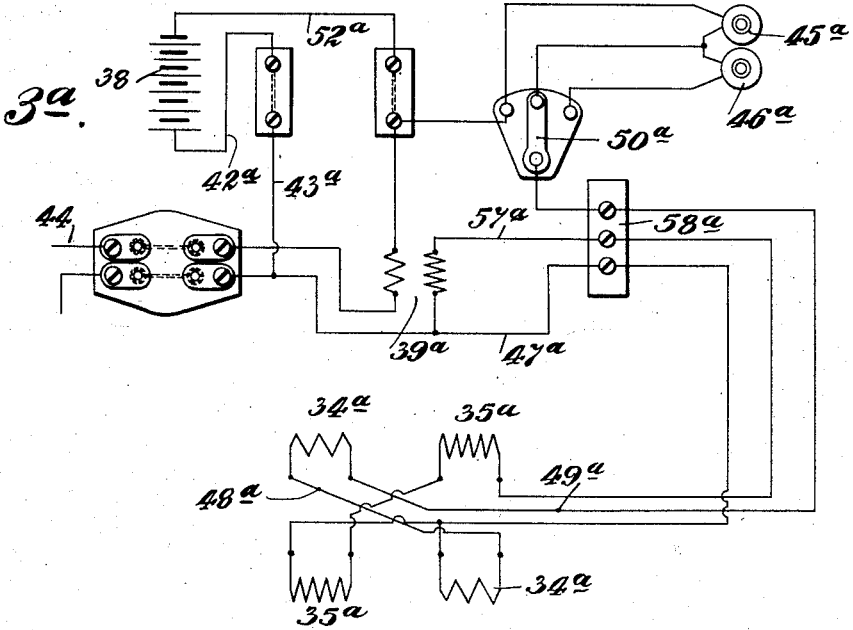
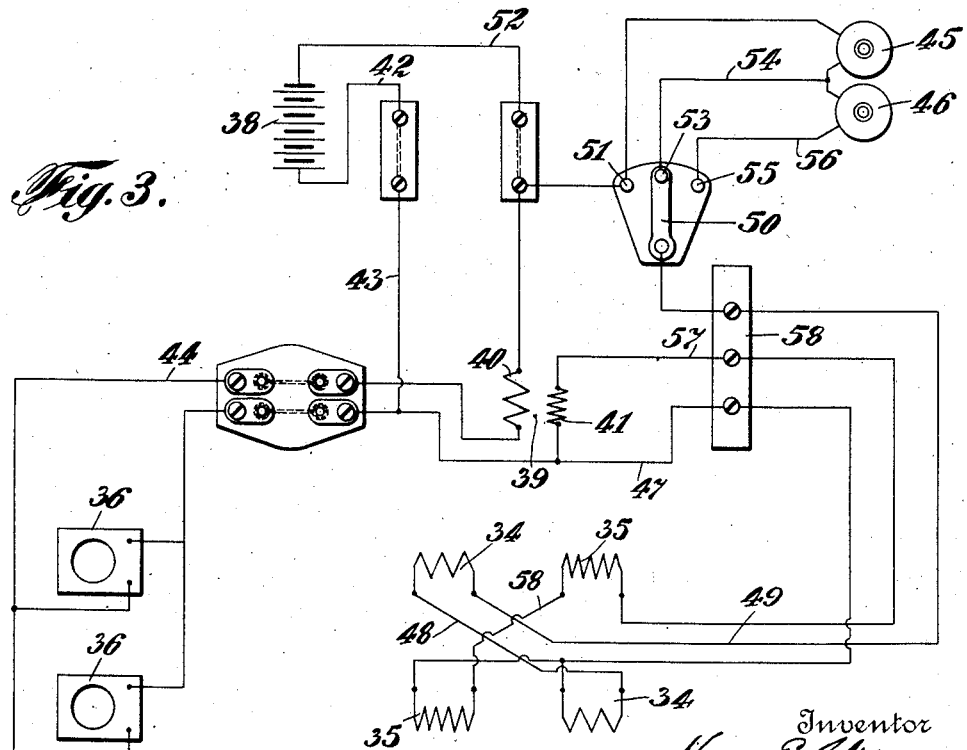
Inventor
Harry E. Chipman
By his Attorney Dec. 28, 1926.
H. E. CHIPMAN
PRODUCTION AND REPRODUCTION OF TALKING MOTION PICTURES
Filed Jan. 26, 1921
1,612,359
3 Sheets-Sheet 3
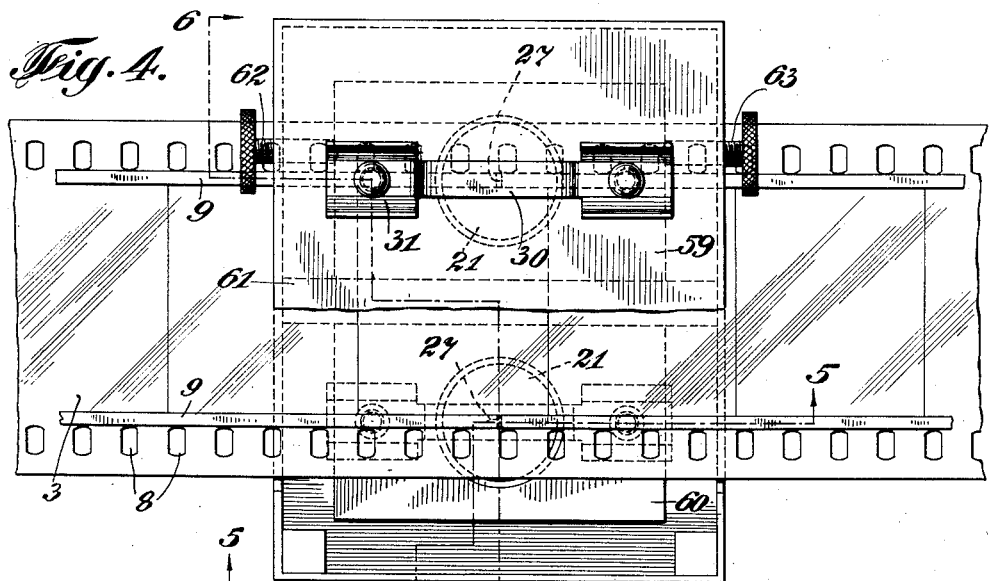
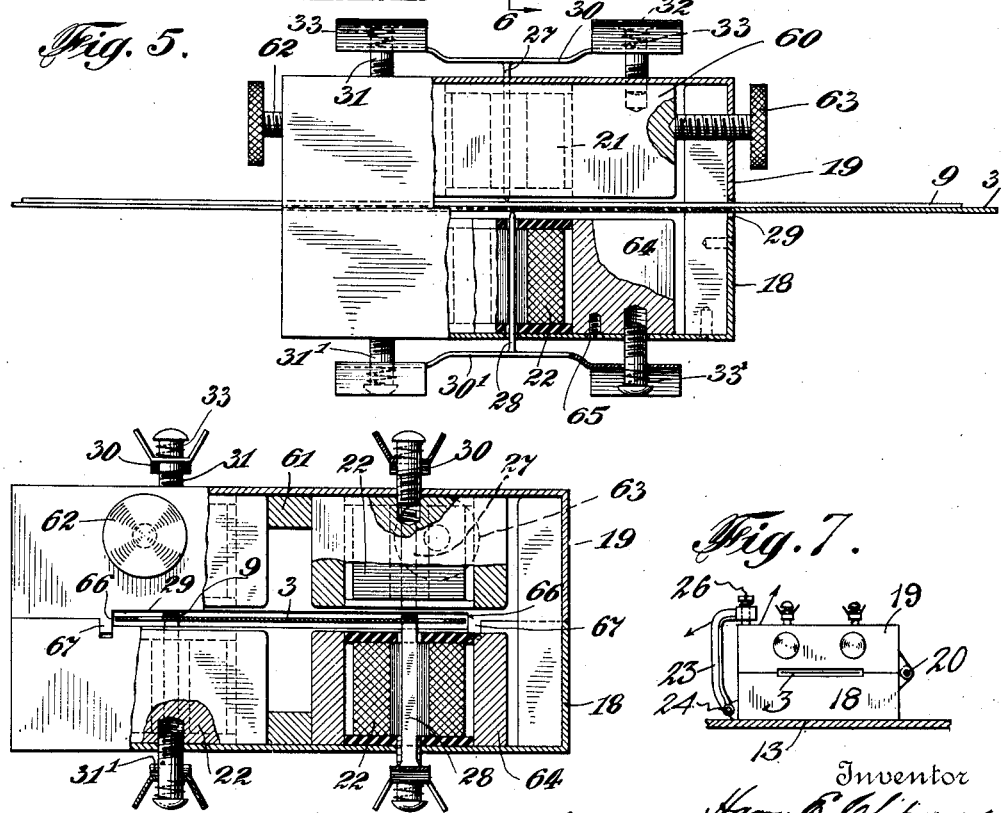
Inventor
Harry E. Chipman
By his Attorney Patented Dec. 28, 1926.

1,612,359

UNITED STATES PATENT OFFICE.

HARRY E. CHIPMAN, OF NEW HAVEN, CONNECTICUT, ASSIGNOR, BY DIRECT AND MESNE ASSIGNMENTS, TO WILLIAM A. CHIPMAN AND ANDREW LE ROY CHIPMAN, BOTH OF NEW YORK, N. Y.

PRODUCTION AND REPRODUCTION OF TALKING MOTION PICTURES.

Application filed January 26, 1921. Serial No. 439,912.

My invention relates to the production and reproduction of talking motion pictures, that is to say, to the production of films carrying a form of sound record thereon, and to means for synchronously exhibiting the motion picture portrayed on the film and reproducing the sound record accompanying the same.

In accordance with my invention the record of the talk or music or other sounds which accompany the action of the motion picture are recorded magnetically on a metal strip or ribbon or ribbons which is or are secured on the face of the motion picture film. By this means perfect synchronism of the sound record and the motion picture is secured.

In recording the sound record magnetically, I make use of the principle which is disclosed for example in patent to Poulson, Number 661,619. My invention relates in part to improvements in the mechanism whereby a clear and accurate form of magnetic sound record may be impressed upon a metallic ribbon, or continuous member of metallic material, which may be secured upon or used in connection with a motion picture film. In this connection I have improved upon the construction of the electromagnets which act to impress the record of varying magnetic intensity upon the metallic ribbon, the arrangements of such electromagnets in connection with the metallic ribbon, the circuit connections by which currents of varying intensity are caused to flow through the electro-magnets and the like. My invention also comprises suitable devices whereby such magnetic sound record and the pictures of the motion picture film may be simultaneously made, on the strip of metallic material and on the motion picture film to which such strip is secured.

The various mechanisms and combinations of parts which go to make up my improved apparatus will appear more fully and at length in the following specification.

In order that my invention may be more clearly understood, attention is hereby directed to the accompanying drawings forming part of this application and illustrating one embodiment of my invention. In the drawings Fig. 1 represents a perspective view of a room in which the record may be made or the exhibition may be given, showing a suitable arrangement of instruments for receiving or transmitting sound, Fig. 2 is a diagrammatic side elevation of my improved apparatus for recording the sound record and the negative motion picture, certain parts being shown in cross-section, Fig. 3 represents a diagram of electrical connections for a sound recording system, Fig. 3ª is a circuit diagram supplemental to that shown in Fig. 3, Fig. 4 is a top plan view on an enlarged scale of the sound recording mechanism shown in Fig. 2, Figs. 5 and 6 are respectively sections taken on lines 5—5 and 6—6 of Fig. 4, and Fig. 7 is a side elevation on an enlarged scale of the recording mechanism shown in Fig. 2.

Referring to the drawings, the apparatus for making the motion picture negative and recording the accompanying sounds comprises a motion picture camera having a casing 1 mounted on a stand 2. The film 3 is wound on a reel 4 from which it is continuously drawn by sprocket 5 and passes through guides 6 past the light opening of the camera the film being moved intermittently past the light opening by any well known mechanism such as that indicated at 7 which is adapted to coact with the perforations in the film to draw the same downwardly in well known manner.

The film 3 as indicated in Fig. 4 may be the usual transparent motion picture film having perforations 8 adjacent its edges. This film has secured thereto a magnetizable member or members on which the magnetic sound record is to be impressed. Preferably a pair of thin, narrow metal ribbons 9, 9 are employed for this purpose, these being secured to one face of the film in parallel relation inwardly from the perforations of the film and between the same and the series of pictures which occupy the central portion of the film.

After passing through guide 6, the film is progressed by a sprocket 10 which rotates constantly, the film being provided with a loop 11 between the guide 6 and sprocket 10 to which the film is progressed by the intermittent actuating member 7 and from which it is progressed by the constantly rotating member 10. The film thence passes under a guide roller 12 into and through the recording head which is indicated generally at 13, and in which the magnetic sound record is impressed upon the ribbons 9. From the recording head 13 the film passes under a guide roller 14, over a sprocket 15, under guide rollers 16 and into the take-up reel 17. The mechanical connections for operating the various moving parts will not be described in detail since the same are common.

The recording head 13 preferably comprises a casing which comprises a bottom member 18 and a top or cover member 19, these members being hinged together as is indicated at 20 in Fig. 13. In the preferred embodiment of the invention a pair of electro-magnets 21, 21 are carried by the upper member 19, beneath which the two strips 9, 9 pass, and a pair of electro-magnets 22 are carried by the lower member 18, above which the two strips 9 pass. The upper and lower casing members 18 and 19 may be clamped together when in operative position, as by means of an arm 23 pivotally connected to the base member 18, as is indicated at 24, arm 23 having an end portion 25 which is adapted to be extended above the upper surface of casing member 19, this end portion 25 having a screw 26 extending through a threaded opening in the same, which screw may be adjusted into clamping contact with the upper surface of casing member 19.

The two upper electro-magnets 21 are provided with core or pole pieces 27 which extend downwardly through the same and the lower electro-magnets 22 are provided with similar core pieces 28 which extend upwardly through the same. The film 3 passes through a slot or opening 29 which extends horizontally through the casing 13 at the line of junction between casing members 18 and 19, as is shown in Figs. 5 and 6. The core pieces 27 are spring-pressed downwardly so as to bear upon the upper surfaces of the metallic ribbons 9 as the film is fed through the apparatus and the core pieces 28 are spring-pressed upwardly into engagement with the under surface of films 3 in longitudinal alignment with the metal ribbons 9. Each core piece 27 is carried by a flat spring-strip 30 which is slidably mounted above casing member 19 on a pair of screws 31 which extend into the top of the casing. Abutments are provided at the tops of screws 31, such as the heads indicated at 32 and spiral springs 33 are positioned about screws 31 between the spring-strip 30 and the head 32 in each instance so as to press strips 30 downwardly to cause spring engagement between the lower ends of the core pieces 27 and the strips which move beneath the same. Core pieces 28 are carried by spring-strips 30′ mounted on screws 31′, these core pieces being spring-pressed upwardly by springs 33′ in the same manner as above described.

The circuit connections by which the magnetic record is impressed on ribbon 9 will now be described. Each of the electro-magnets 21 and 22 is provided with a primary winding such as that indicated at 34 and with a secondary winding such as that indicated at 35, referring to Fig. 3.

The record is made by means of one or more instruments 36, which may be telephone transmitters or like devices, each comprising a diaphragm against which the sound waves impinge and electro-magnets which are energized with a varying intensity, in accordance with the movements of the diaphragm under the action of the sound waves impinging upon the same, in the well known manner. When the sound record is made, or when the record is made and the corresponding motion picture is taken, in a room such as that indicated at 37 in Fig. 1, the transmitters 36 may be located at various points about the walls of the room so that the sound waves will be picked up strongly by one or another of the instruments at whatever point in the room the performer may be located.

A battery 38 is located at a convenient point such as the bottom of the stand 2 of the camera. An induction coil 39 having primary and secondary windings 40 and 41 is also positioned at a suitable point, as on the back of the camera.

The electro-magnets within transmitters 36 are constantly energized by means of a circuit which may be traced from battery 38 through connection 42 to the panelboard on the back of the camera, thence by connection 43 through the electro-magnets of instruments 36, in parallel arrangement, and thence by connection 44 through the primary winding 40 of induction coil 39 back to the battery.

The primary windings, such as 34, of the electro-magnets 21 and 22 of the recording devices are constantly energized from battery 38 so as to maintain the opposite polarities of the core pieces. The strength of the current with which the primary windings such as 34 of the recording electro-magnets are energized, may be controlled by means of a pair of resistances 45 and 46, mounted at the back of the camera. Referring to Fig. 3, current flows from the battery through connection 43, thence through connection 47 to a primary winding 34 of one of the recording electro-magnets, thence through connection 48 and through the other primary winding 34, indicated, in series, thence through connection 49 to switch 50. When this switch is on contact 51 circuit will then be completed through connection 52 back to battery. When the switch is on contact 53, the circuit will be completed through connection 54 and the resistance 45, back to battery. When the switch is on contact 55, the circuit will be completed through connection 56, the two resistances 46 and 45, in series, and the connection 52, back to battery.

When sound waves impinge against the diaphragms of instruments 36 the current will of course be varied accordingly in the circuit which includes the electro-magnets of instruments 36 and the primary winding 40 of induction coil 39. A corresponding varying current will be induced in the secondary winding of coil 39 and this winding is connected in circuit with the secondary windings 35 of the recording electro-magnets. A circuit may be traced from the secondary winding 41 through connection 57 to the secondary winding 35 of one of the recording electro-magnets thence by connection 58 through the other secondary winding 35 indicated, in series, and thence by connection 47 back to the other terminal of secondary winding 41 of induction coil 39. It will be evident that as many primary windings 34 and secondary windings 35 as are required may be connected, in series, with each other in the manner indicated. The result of the construction described is to vary the magnetic fields of the recording electro-magnets in accordance with the sound wave vibrations received by the transmitters 36 and accordingly to magnetize the metal ribbons 9, as they pass through the recording head, with a corresponding magnetization of varying intensity.

As stated, in the preferred embodiment of my invention, the film strip carries a pair of spaced metal ribbons 9 on which duplicate magnetic sound records are impressed, in order that the volume of re-production shall be correspondingly greater. The connections illustrated in Fig. 3, and which have just been described, are those for the aligned upper and lower electro-magnets between which pass one of the metal ribbons 9 only. In Fig. 3ª I have illustrated the entirely similar circuits which are used in connection with the similar electro-magnets on the opposite side of the film. As is shown in Fig. 3ª, this second pair of electro-magnets may comprise primary coils 34ª and secondary coils 35ª which are connected together in the same manner as coils 34 and 35 just described. Connections 47ª, 49ª and 57ª extend from these windings to a connection block 58ª entirely similar to the block 58 used in the connections of windings 34 and 35. Connection is made from this block to an induction coil 39ª, and to a switch 50ª, the other connections leading to the circuit 44 and transmitters 36 being the same as in the circuit already described.

In the preferred embodiment of my invention the lower core pieces 28 are offset somewhat in the direction of travel of the film 3 from the corresponding upper core pieces 27, so that, if the metal ribbons 9 are placed on the upper surface of the film, a given point on the film will reach an upper core piece 27 slightly before it reaches the corresponding lower core piece 28. I have found in actual practice that a clearer record is obtained in this manner than when the upper and lower cores or pole pieces are exactly in vertical alignment. It would appear that when the magnetic lines of force pass through the moving strip 9 from an upper pole piece to a lower pole piece which is somewhat farther along, in the direction of motion of the film, a slight time interval has been given during which the record is more truly impressed upon the metal ribbon than could be the case if the pole pieces were exactly in alignment. On the other hand, if the pole pieces are too far separated, the magnetic lines would be too much drawn out to result in a perfect record of the variations being made. Accordingly, I provide means for adjusting the gap, in the longitudinal direction of the film, between the upper and lower pole pieces. In actual practice I find that a longitudinal distance of about one thirty-second of an inch between the upper and lower pieces, gives good results, when the film is being progressed at about the usual rate of speed.

Details of the preferred construction of the recording head are given in Figures 4, 5, and 6. The upper electro-magnets are carried by blocks 59 and 60 which are separated from each other by a longitudinal guide or division strip 61. These upper bearing blocks 59 and 60 may be adjusted longitudinally independently of each other by means of adjusting screws such as those shown at 62 and 63 at the opposite ends of each block. The lower electro-magnets are mounted in similar blocks, such as that indicated at 64, these blocks being fixedly secured to the lower casing member 18 as by means of screws 65.

The longitudinal slot 29 through which the film is progressed is given smooth side surfaces 66, by means of tongues 67 formed on the upper casing member 19 and adapted to be received in similar recesses in the lower casing member 18, the width of the slot 29 being of exactly the proper dimension to contain and guide the film.

It is believed that the operation of the various instrumentalities described will be clear from the above description. It may be noted that the secondary windings 35, etc., of the recording electro-magnets are wound next to the pole pieces of the respective magnets.

It should be understood that my invention is not limited strictly to the details of construction described, but is as broad as is indicated by the accompanying claims.

What I claim is:—

1. In recording and reproducing devices, the combination of upper and lower electromagnets having primary and secondary windings thereon, connections for causing a constant current to flow through said primary windings, means for causing a current to flow through said secondary windings with a varying intensity corresponding to sound vibrations, core pieces within said coils, and means for progressing between said core pieces a continuous member of magnetizable material.

2. In recording and reproducing devices, the combination of an electromagnet having primary and secondary windings thereon and a core piece therein, an induction coil, a source of current, a telephone transmitter, a circuit including said transmitter, source, and primary winding of said coil, a circuit for energizing the primary winding of said electromagnet, a circuit including the secondary winding of said electromagnet and the secondary winding of said coil, and means for progressing a continuous member of magnetizable material past said core piece.

3. In recording and reproducing devices, the combination of a pair of upper, laterally spaced electromagnets and a pair of lower, laterally spaced electromagnets, means for progressing between said upper and lower electromagnets a continuous film strip carrying parallel metal ribbons, aligned with said electromagnets, and circuits including said electromagnets, adapted to have the current therein varied from moment to moment in accordance with sound wave vibrations.

4. In recording and reproducing devices, the combination of a pair of upper, laterally spaced electromagnets, and a pair of lower, laterally spaced electromagnets, means for progressing between said upper and lower electromagnets a continuous film strip carrying parallel metal ribbons, aligned with said electromagnets, and means for varying the magnetization of said magnets from moment to moment so as to produce duplicate magnetic sound records on said parallel metal ribbons.

5. In recording and reproducing devices, the combination of upper and lower electromagnets, means for progressing between the same a continuous ribbon having magnetizable material on at least one side thereof, and a circuit including said magnets, adapted to have the current therein varied from moment to moment in accordance with sound wave vibrations, said magnets having pole pieces on opposite sides of said ribbon, one of said pole pieces being slightly in advance of the other, in the direction of progress of the ribbon.

6. In recording and reproducing devices, the combination of upper and lower electromagnets, means for progressing between the same a continuous ribbon having magnetizable material on at least one side thereof, and a circuit including said magnets, adapted to have the current therein varied from moment to moment in accordance with sound wave vibrations, said magnets having pole pieces on opposite sides of said ribbon, one of said pole pieces being slightly in advance of the other, in the direction of progress of the ribbon, and means for adjusting the position of one of said electromagnets, so as to adjust the longitudinal distance between said pole pieces.

This specification signed this 12th day of January, 1921.

HARRY E. CHIPMAN.